United States Patent [19]
Valier et al.

[11] Patent Number: 5,566,778
[45] Date of Patent: Oct. 22, 1996

[54] CONTROL ASSEMBLY FOR OPERATING AN AGRICULTURAL TRACTOR

[75] Inventors: Carlo Valier; Tiziano Salvini, both of Milan, Italy

[73] Assignee: SAME S.p.A, Treviglio, Italy

[21] Appl. No.: 430,370

[22] Filed: Apr. 28, 1995

[30] Foreign Application Priority Data

Aug. 3, 1994 [IT] Italy .................. TO940172 U

[51] Int. Cl.[6] .................. B60K 26/00; B60K 23/00
[52] U.S. Cl. .................. 180/334; 180/336; 74/473 R; 297/411.35; 297/411.38
[58] Field of Search .................. 180/329, 330, 180/333, 334, 336; 74/471 XY, 473 R, 523; 248/118.5; 297/411.35, 411.38; 296/153

[56] References Cited

U.S. PATENT DOCUMENTS

| | | | |
|---|---|---|---|
| 4,055,230 | 10/1977 | Kestian et al. | 180/333 |
| 4,063,610 | 12/1977 | Shilling | 180/287 |
| 4,200,166 | 4/1980 | Hansen | 74/523 |
| 4,416,488 | 11/1983 | Wall | 297/411 |
| 4,646,869 | 3/1987 | Kerner | 180/334 |
| 4,914,976 | 4/1990 | Wyllie | 74/523 |
| 5,042,314 | 8/1991 | Rytter et al. | 74/471 XY |
| 5,086,869 | 2/1992 | Newbery et al. | 180/329 |
| 5,244,066 | 9/1993 | Mackoway et al. | 192/13 R |
| 5,286,078 | 2/1994 | Mottino et al. | 296/153 |
| 5,315,900 | 5/1994 | Teeter | 477/165 |
| 5,365,803 | 11/1994 | Kelley et al. | 74/484 R |
| 5,407,249 | 4/1995 | Bonutti | 297/411.35 |

FOREIGN PATENT DOCUMENTS 61-235227  10/1986  Japan .................. 180/333

*Primary Examiner*—Paul N. Dickson
*Attorney, Agent, or Firm*—Sughrue, Mion, Zinn, Macpeak & Seas

[57] ABSTRACT

A control assembly for operating an agricultural tractor has control members (21, 22, 23, 25, 26) grouped onto a control unit (20) carried by an arm rest (1) intended to be associated to the driver's seat of the tractor. The arm rest (1) comprises a body (2) connected to a support (3) in a swingable way with adjustable inclination, as well as in a longitudinally slidable and adjustable way, and also in a rotatable way with adjustable angular position.

8 Claims, 5 Drawing Sheets

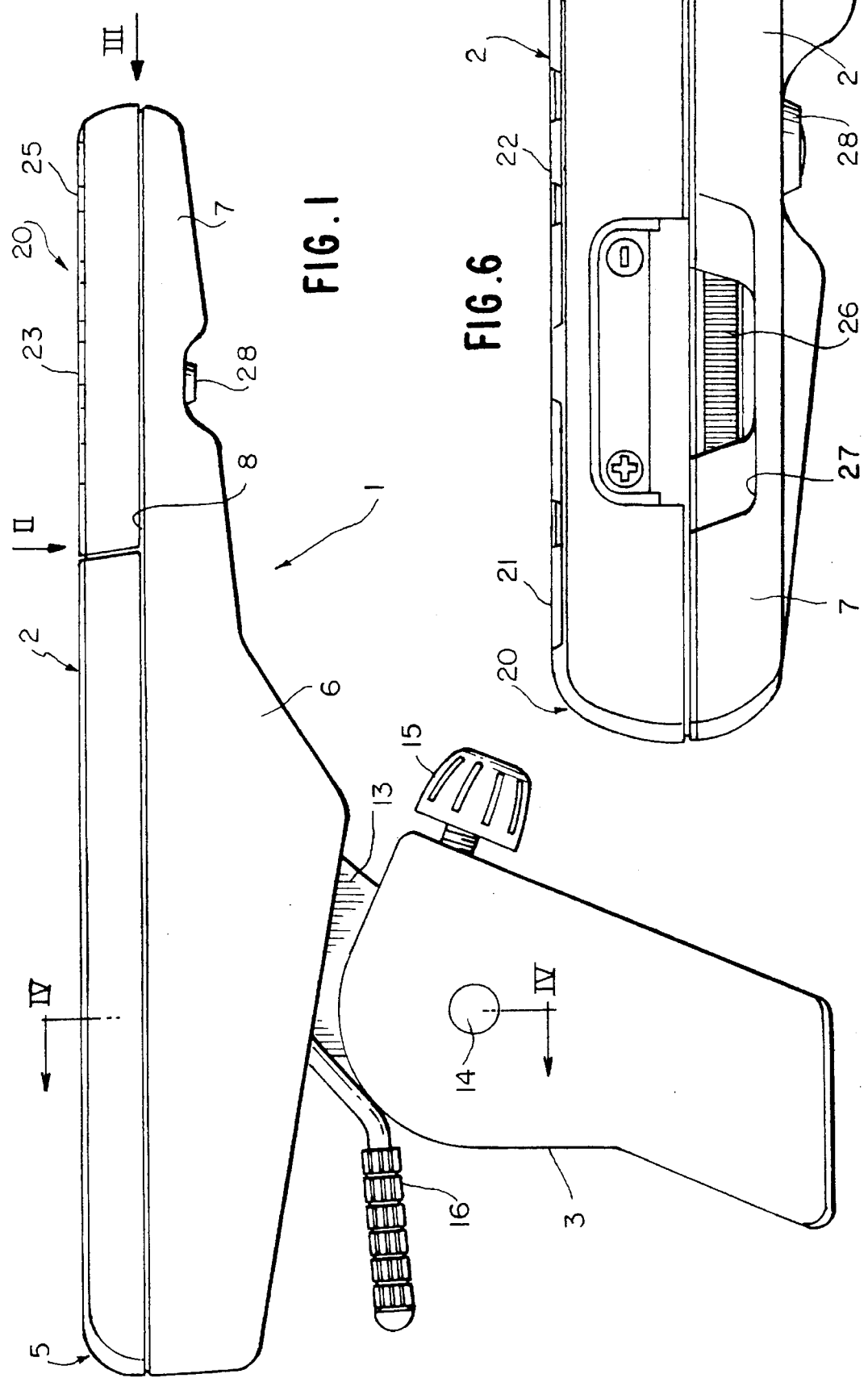

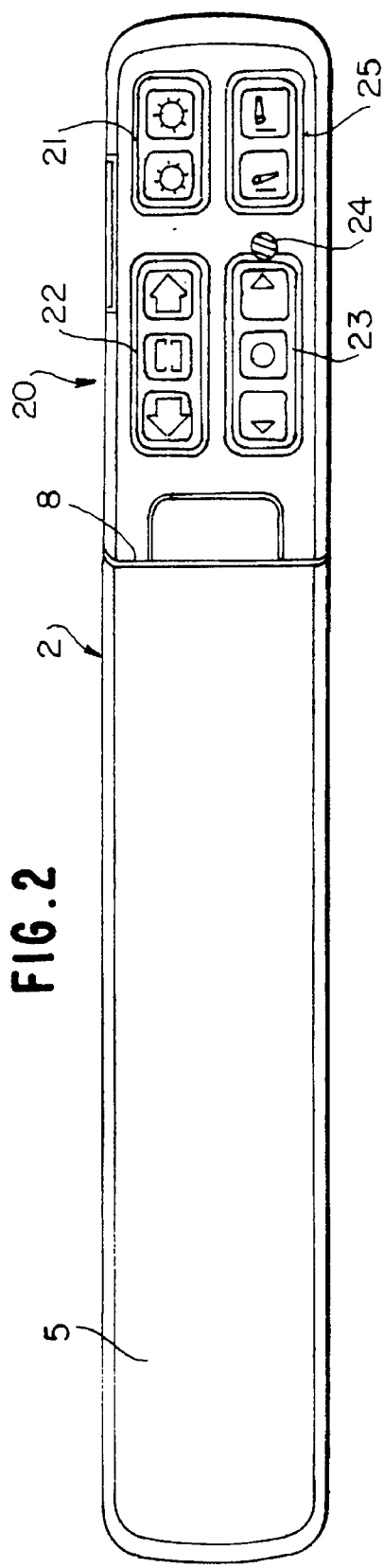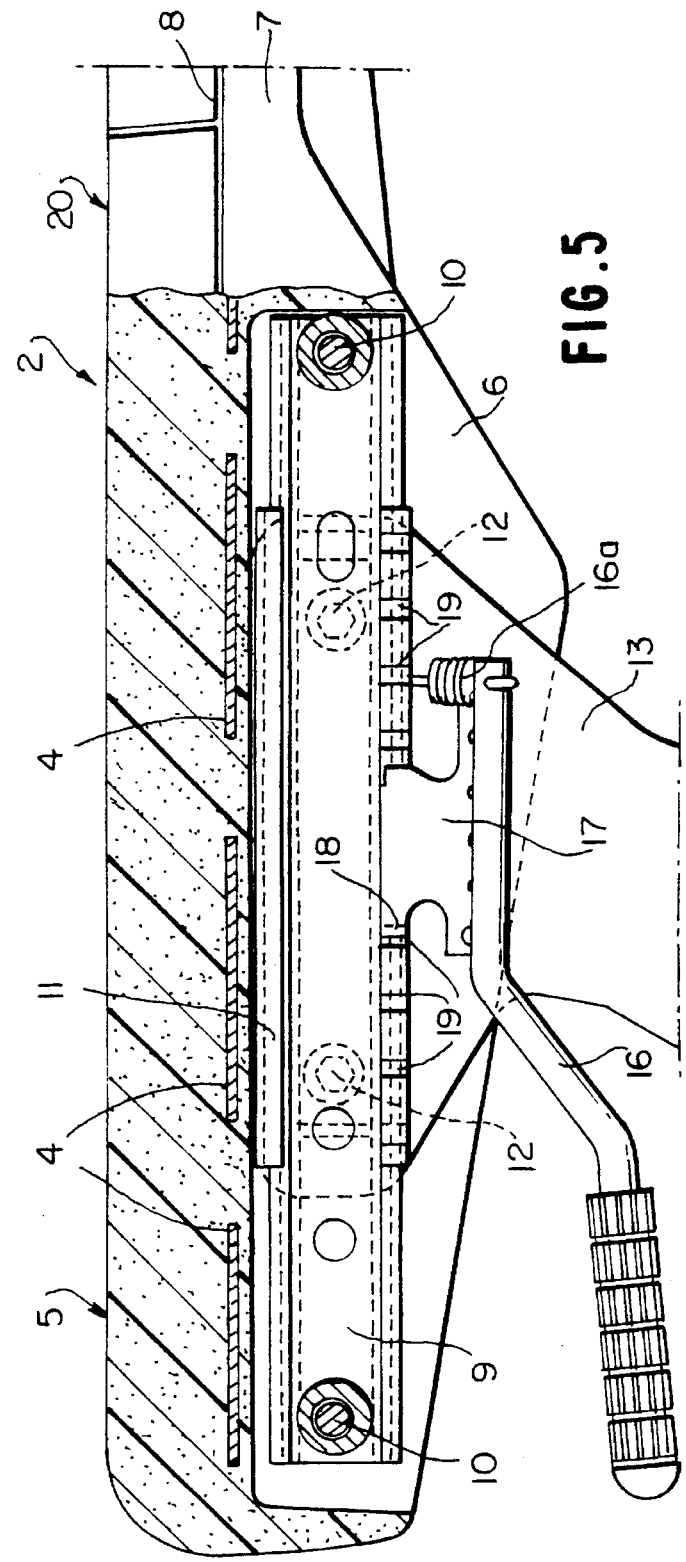

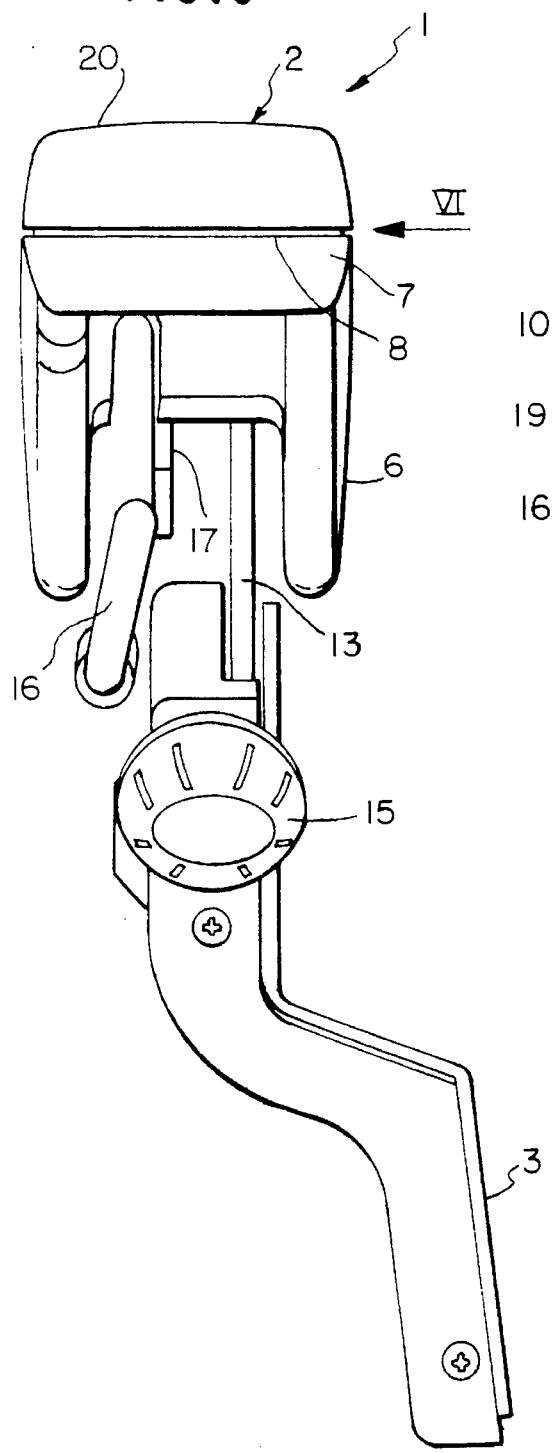
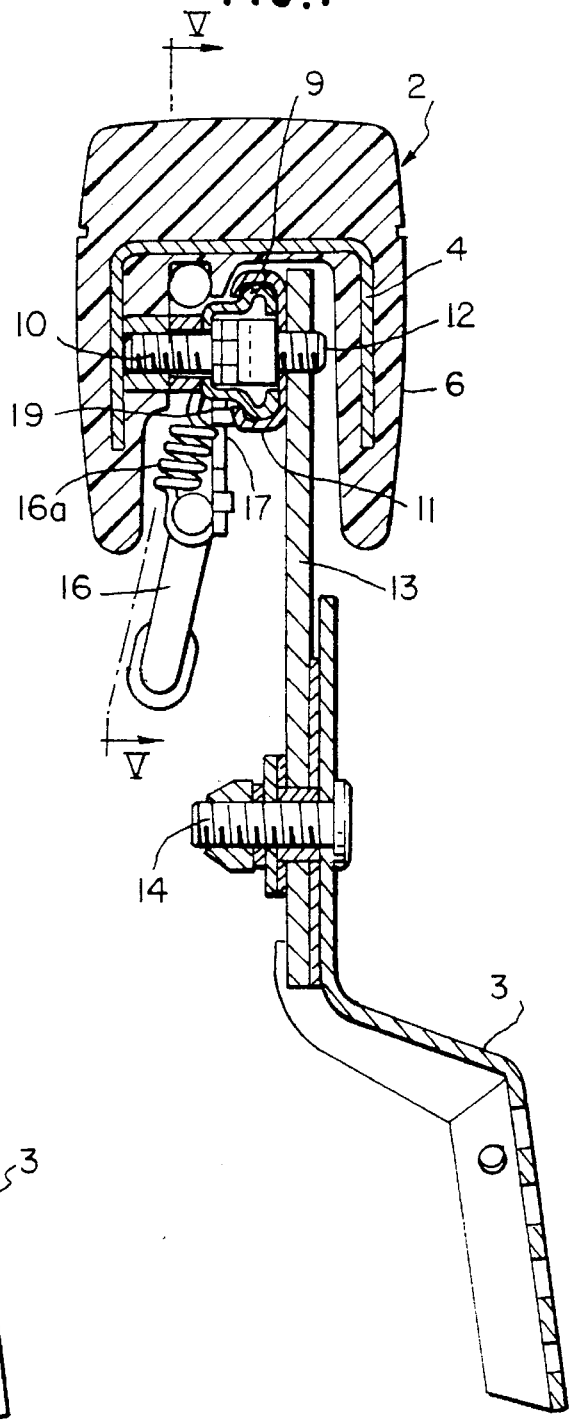

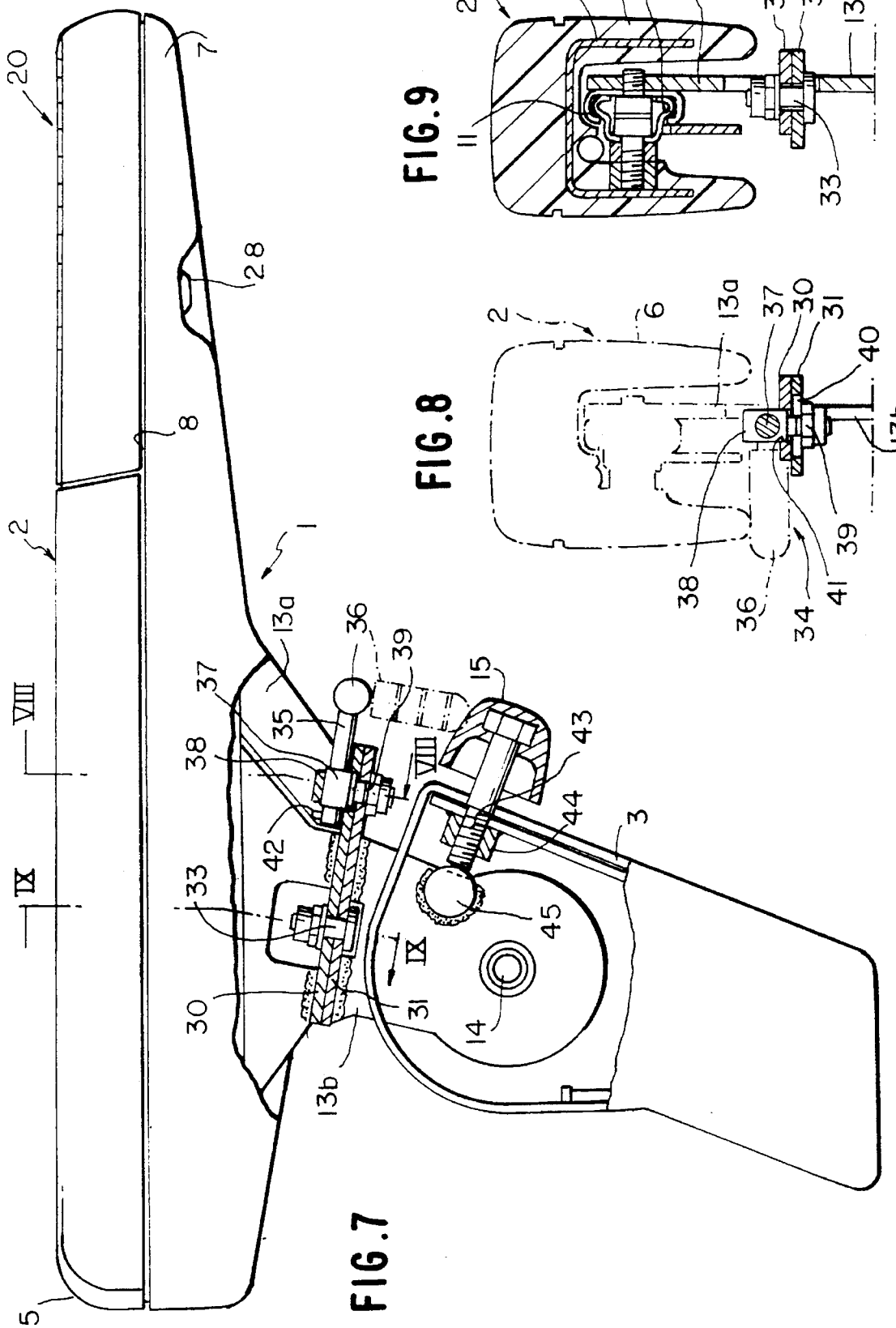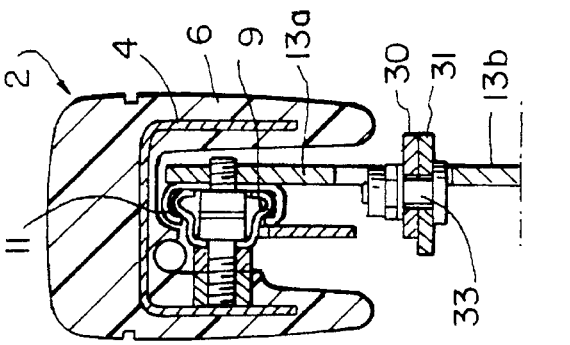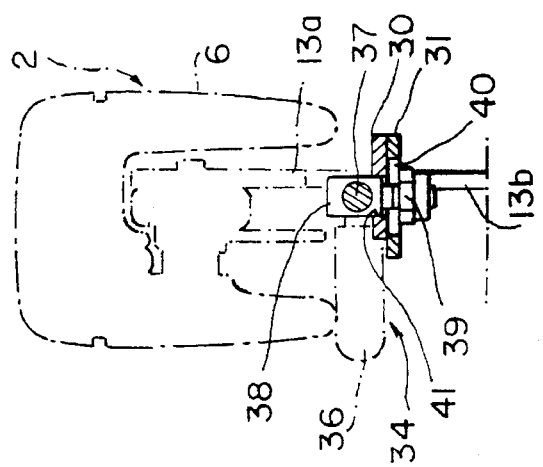

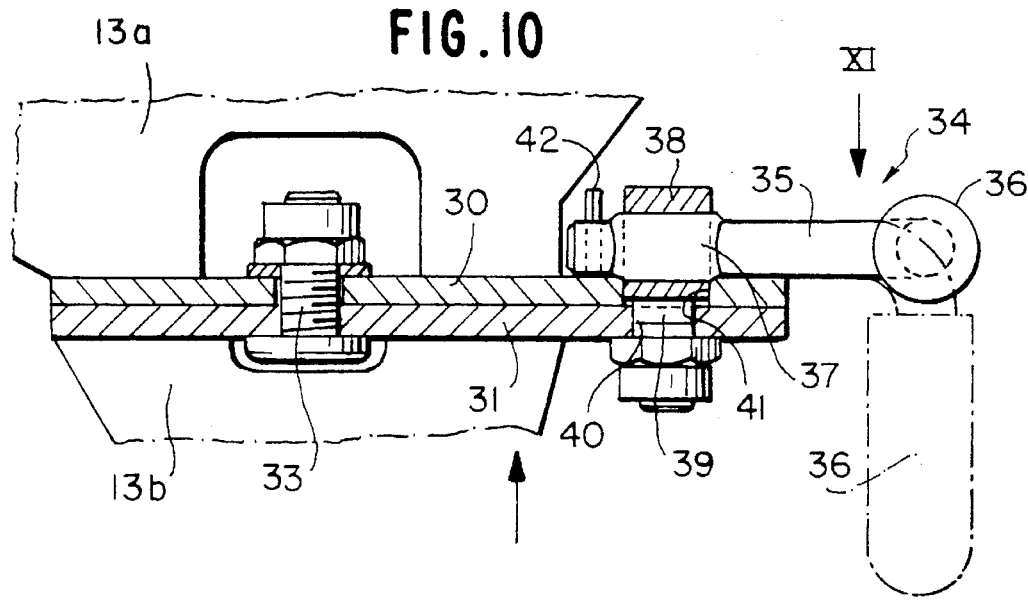
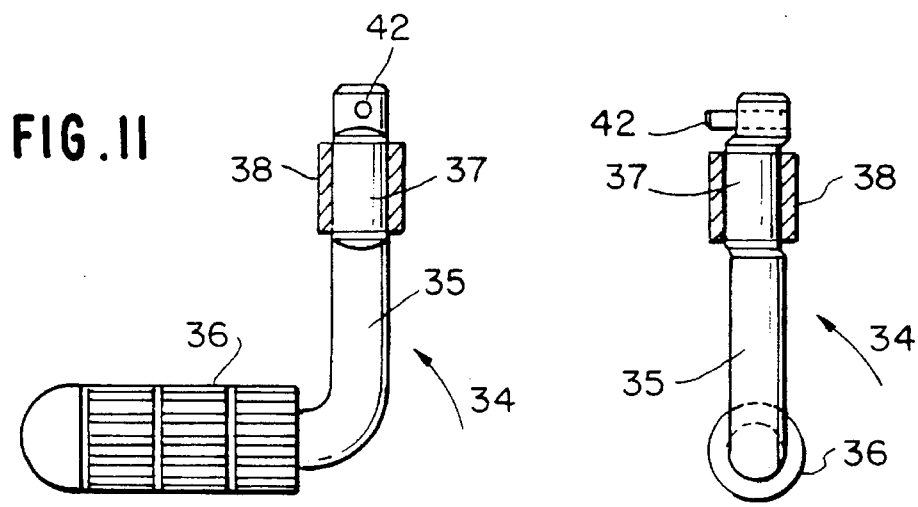
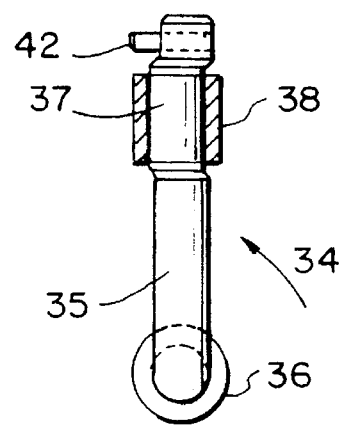
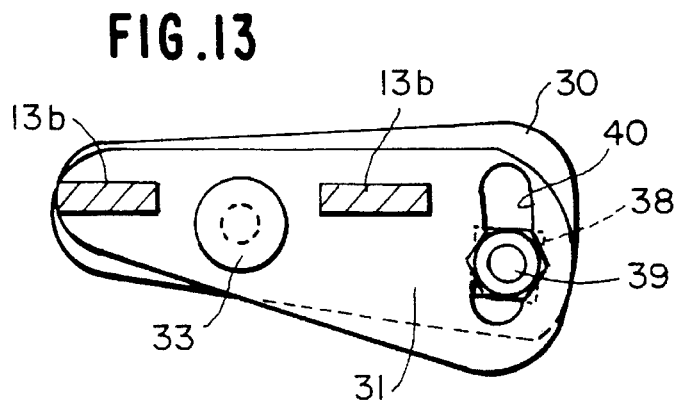

CONTROL ASSEMBLY FOR OPERATING AN AGRICULTURAL TRACTOR

BACKGROUND OF THE INVENTION

The present invention is related to control assemblies for operating agricultural tractors provided with a power-shift electronically controlled transmission with a reversing gear and associated first control members for the gear ratio shifting and second control members for selecting forward and reverse speed, as well as with an electronic control device for the engine rotation speed with associated third control members.

Traditionally the above control members for operating an agricultural tractor are arranged in different areas within the driver's cab or, according to more recent solutions, they are grouped in a control handle, which may possibly perform additional functions. In both cases operation of the control members by the driver can be sometimes uncomfortable and inconvenient.

It is known, in the field of bulldozers and earthworking vehicles, to have a control console arranged on one side of the vehicle operator's seat. For instance, patent U.S. Pat. No. 4,646,869 discloses a console with projecting control levers and patent U.S. Pat. No. 5,244,066 shows a control console with control levers and a rotary knob extending from the front end of an operator's seat handrest. These arrangements employ mechanical linkages housed within the console, thus involving problems of encumbrance and a bulky construction. Moreover, operation thereof may be uncomfortable and fatiguing.

Similar arrangements, specifically applied to tractors, are also disclosed in patents U.S. Pat. No. 4,055,230 and U.S. Pat. No. 5,086,869 as well, in connection with a fork lift truck, in FR-A-2.388.692.

Also known are, in the field of omnibus and cars and even aircrafts, switch control units for operating auxiliary electrical equipment, which are carried by a vehicle seat armrest, as in the case of European patent application EP-A-0537718 and patent U.S. Pat. No. 4,416,488.

SUMMARY OF THE INVENTION

The object of the present invention is to provide a control assembly for operating an agricultural tractor of the above-referenced type, arranged on an armrest intended to be associated to the driver's seat of the tractor, which is simple, functional and of reduced encumbrance and which can be more conveniently, readily and easily actuated by the driver.

According to the invention, this object is achieved essentially by virtue of the fact that said first, second and third control members of the control assembly are constituted by respective keys grouped on an electrical control unit fitted within a front depression of the arm rest body, substantially flush with said body.

The arm rest body conveniently further comprises a substantially vertical support adapted to be secured to the driver's seat of the tractor, and the arm rest body is swingably connected to said support around a substantially horizontal axis oriented transversally of said body. In this case adjustment means are provided for adjusting the inclination of the body relative to the support of the arm rest.

Furthermore, the arm rest body may advantageously be connected to the support in a longitudinally displaceable way, and adjustment means are provided for adjusting the longitudinal position of the body relative to the support.

The arm rest body may further be rotatably connected to said support around a substantially vertical axis, and in this case adjustment means are provided for adjusting the angular position of the body relative to said substantially vertical axis.

In case the agricultural tractor is further provided with an electronically controlled fine adjustment device of the engine rotation speed and associated manual control member, said manual control member is conveniently constituted by a roller rotatably carried by said control unit on one side of the arm rest.

In case the tractor is provided with a three-point hitch having an electronically controlled power lift with associated fourth control members, these fourth control members are also conveniently constituted by respective keys arranged on said control unit carried by the arm rest.

According to another feature of the invention, the arm rest is further provided with a consent push button which is manually operable for activating and deactivating said control unit.

BRIEF DESCRIPTION OF THE DRAWINGS

The invention will now be disclosed in detail with reference to the annexed drawings, purely provided by way of non limiting example, in which:

FIG. 1 is a diagrammatic lateral elevational view of an arm rest provided with a control assembly for operating an agricultural tractor according to the invention, FIG. 2 is a top plan view according to arrow II of FIG. 1, FIG. 3 is a side elevational view in an enlarged scale according to arrow III of FIG. 1, FIG. 4 is a vertically sectioned and enlarged view along line IV—IV of FIG. 1, FIG. 5 is a longitudinally sectioned view along line V—V of FIG. 4, FIG. 6 is a partial lateral elevational and enlarged view according to arrow VI of FIG. 3, FIG. 7 is a partially sectioned and simplified view similar to FIG. 1, showing an alternative embodiment of the control assembly according to the invention, FIG. 8 is a partially vertically sectioned view along line VIII—VIII of FIG. 7, FIG. 9 is a partially vertically sectioned view along line IX—IX of FIG. 7, FIG. 10 is an enlarged view of a detail of FIG. 7, FIG. 11 is a top plan and partially sectioned view according to arrow XI of FIG. 10 in a first position, FIG. 12 is a view same as FIG. 11 in a second position, and FIG. 13 is a bottom plan view in a reduced scale according to arrow XIII of FIG. 10.

DETAILED DESCRIPTION OF THE INVENTION

Referring initially to FIGS. 1–6, reference numeral 1 generally designates an arm rest which is intended to be applied on one side of the seating portion of a driver's seat of an agricultural tractor, not shown since of a generally conventional type. The arm rest 1 comprises a substantially horizontal elongated body 2 carried on top of a shaped plate 3 provided for securing the arm rest 1 to the seat structure.

The body 2 comprises an inner rigid framework 4 incorporated within a member 5 of foamed plastic material or the like, having a rear portion 6 with a substantially upside-down U shape, and a tapered front portion 7 formed superiorly with a depression 8.

Referring in detail to FIGS. 4 and 5, the rear portion 6 of the body 2 of the arm rest 1 is interiorly provided with a longitudinal sliding guide 9 which is fixed to the framework 4 by means of screws 10 and is slidably engaged along a complementary stationary guide 11, fixed by means of screws 12 to a bracket 13 projecting below the body 2.

The bracket 13 is connected at a lower end thereof to the upper portion of the plate 3, through a friction articulated joint 14 by means of which the body 2 is swingable relative to the tractor seat between a substantially vertical raised position, and a lowered position depicted in the drawings. The configuration of the body 2 in the lowered position is adjustable on opposite sides with respect to a perfectly horizontal position (shown in the figures) for a certain angular amplitude around the horizontal transverse axis of the articulated joint 14, to the aim of adjusting the inclination of the body 2 of the arm rest 1 to the user's need. For such an adjustment a rotatable threaded stop member 15 is provided for, which is carried by the plate 3 and is frontally abutting at its inner end against the bracket 13. By screwing or, respectively, unscrewing the stop member 15 relative to the plate 3, a corresponding variation of the angular position of the bracket 13 is achieved in the lowered position of the body 2 of the arm rest 1, with a more or less inclination of this body 2 upwardly or, respectively, downwardly.

By means of the two longitudinal guides 9 and 11, the longitudinal position of the body 2 of the arm rest 1 can be adjusted relative to the plate 3, as a function of the user's need. To such effect a swinging lever 16 is provided which is placed beneath the rear portion 6 of the body 2 and has an anchoring part 17 rotatably connected on one side to the guide 9. On the other side, the anchoring part 17 is formed with a retaining tooth 18 which is adapted to be selectively engaged into one of a number of equally-spaced apart notches or slits 19 formed in the lower portion of the stationary guide 11. A traction helical spring 16a draws the lever 16 towards the engaged position, so as to prevent sliding of the body 2 relative to the plate 3.

For the longitudinal adjustment of the body 2 relative to the plate 3 it is sufficient to manually move upwardly the lever 16, against the action of the spring 16a, so as to disengage the retaining tooth 18 from the corresponding notch 19, and then to displace the body 2 by sliding the guide 9 along the guide 11 until the desired position is reached. Locking in this position is automatically performed by releasing the lever 16 which is thus brought by the spring 16a to the lowered position, so as to have the retaining tooth 18 engaged within the notch 19 corresponding to the selected position.

Referring now in detail to FIGS. 2 and 6, in correspondence of the depression 8 of the front portion 7 of the body 2 an electrical control unit, generally designated as 20, is seated which completes the profile of the front portion 7 of the body 2 and is flush with the upper and side surfaces thereof.

' The control unit 20 is including a series of control members through which the tractor driver can perform active operating thereof in a convenient and easy way, only with the hand corresponding to his arm resting on the arm rest 1.

More particularly, on the upper face of the control unit 20 the following control members are arranged:

a pair of first control keys 21 whose depression operates up-shifting or down-shifting of the speed ratio, respectively, in an electronically controlled power-shift transmission, of a known type, of the tractor;

a triad of second control keys 22 whose depression enables selecting forward speed, reverse speed (through the known electronically controlled reversing gear of the power-shift transmission) and the neutral condition of the tractor, respectively;

a triad of third control keys 23 which can be used respectively to store or recall a maximum value or a minimum value of the rotation speed of the tractor engine, or for maintaining the current rotation speed, via an electronically controlled device, also of a conventional type, of the rotation speed. To the triad of third keys 23 a visual display 24 is operatively associated, for displaying when storage has been carried out and for displaying the on-off condition of the electronic control device of the engine rotation speed;

a pair of fourth control keys 25 which can be actuated to operate raising and lowering of the electronically controlled power lift of the three-point hitch of the tractor, respectively.

The control keys 21, 22, 23, 25 and the display 24 are operatively connected to respective electrical or electronic circuits, housed within the control unit 20 and in turn connected to the respective controlled systems (electronic control devices of the power shift transmission and associated reversing gear, electronic control device of the engine rotation speed, electronic control device of the power lift of the rear three-point hitch, respectively).

In case the agricultural tractor is further provided, even in a known way, with an electronically controlled adjustment or fine correction device of the engine rotation speed, an additional manual control member for this device is contemplated, which is constituted by a knurled roller 26 rotatably connected to the bottom of the control unit 20 and housed within a lateral seat 27 formed in the inner side of the front portion 7 of the arm rest body 2. This roller 26 may for instance be part of an optical encoder operatively connected to an electrical or electronic circuit contained within the control unit 20 and in turn connected to the electronically controlled fine adjustment device of the rotation speed of the tractor engine.

To the aim of preventing accidental or undesired actuation of the various control members of the arm rest 1 disclosed in the above, a consent push button 28 (FIGS. 1 and 6) is also provided fort projecting downwardly from the front portion 7 of the body 2, beneath the control unit 20. The push button 28, which can be readily operated by one operator's finger, is operatively connected to the control unit 20 and enables, according to the set position thereof, inhibiting or enabling activation of this control unit 20, respectively.

The alternative embodiment shown in FIGS. 7–13, wherein parts which are identical or similar to those already disclosed are indicated with the same reference numerals, differs from the embodiment of FIGS. 1–6 essentially in that, further to adjustment of the inclination and adjustment of the longitudinal position (whose components already previously disclosed have been omitted for the sake of simplicity of illustration), the body 2 of the arm rest 1 is also angularly adjustable relative to the support plate 3 around a substantially vertical axis.

In detail, according to this variant the bracket 13 is divided into an upper bracket portion 13a and a lower bracket portion 13b, to each of which a respective transverse plate 30, 31, respectively, is fixed by welding. The two plates 30, 31 are parallel to each other and bear one against the other in a mutually rotatable way, such as explained herebelow.

The plates 30, 31 are connected therebetween by means of a pivot pin 33 whose axis defines the above substantially vertical axis around which the body 2 of the arm rest 1 is rotatable relative to the support plate 3. For the angular adjustment of the body 2 around the axis of the pivot 33, a releasable locking member is provided, which is formed by a L-shaped lever 34, shown in detail in FIGS. 11 and 12, comprising an arm 35 and a manoeuvring handle 36 perpendicular to the arm 35. This arm 35 has an eccentric portion 37 rotatably engaged within a bush 38 fixed below to a bolt 39 which is fitted across an arcuate slot 40 of the lower plate 31. The bush 38, which has an outer prismatic shape, is fitted into an opening 41 formed in the upper plate 30 above the slot 40.

The end of the arm 35 opposite to the manoeuvring handle 36 in provided with a radial pin 42 the function of which is both to prevent axial withdrawal of the arm 35 relative to the bush 38, and to stop rotation of the lever 34 from the raised locking position shown in FIG. 8 and FIGS. 7 and 10, to the lowered unlocked position shown with dotted lines in FIGS. 7 and 10. In the raised locking position the eccentric portion 37 co-operates with the bush 38 so as to pack the plates 30 and 31 therebetween via the bolt 39, so as to prevent relative angular displacement thereof. In the lowered unlocked position the plate 30, the upper bracket portion 13a along with the body 2 of the arm rest 1, are free to rotate around the axis of the pivot 33 relative to the plate 31 of the lower bracket portion 13b, and thus relative to the support plate 3, for an angular extent delimited by the extension of the slot 40 across which the bolt 39 is fitted. This angular extent can be for instance of about 23° and defines the lateral adjustment range of the body 2 around the axis of the pivot 33.

With this arrangement, the position of the control unit 20 can be to advantage fully adapted and adjusted to the tractor operator's need, thus ensuring optimum operation comfort.

FIG. 7 depicts also in better detail the cooperation between the rotatable threaded stop member 15 and the lower bracket portion 13b, for the adjustment of the body 2 of the arm rest 1 around the horizontal transverse axis 14. As it is apparent from this figure, the stop member 15 has a threaded stem 43 screwed into a nut 44 fixed to the support plate 3, and adapted to frontally bear under pressure at its free end against a circular element 45 secured at the corresponding edge of the lower bracket portion 13b.

Naturally the details of construction and the embodiments may be widely varied with respect to what has been disclosed and illustrated, without thereby departing from the scope of the present invention. Thus, for example, it is evident that the number, the arrangement and the functions of the various control members associated to the unit 20 carried by the arm rest 1 might be different from those disclosed by way of example, without thereby altering the advantageous effect deriving from the invention in terms of better convenience and comfort of active operating of the agricultural tractor afforded by the arm rest and incorporated control unit according to the invention.

What is claimed is:

1. A control assembly for operating an agricultural tractor having a driver's seat arm rest including an arm rest body, an electronically controlled power-shift transmission with a reversing gear and associated first control members for the gear ratio shifting and second control members for selecting forward speed and reverse speed, and an electronic control device of the engine rotation speed with associated third control members, wherein said control assembly is an electrical control unit arranged on said armrest and fitted within a front depression of the arm rest body, substantially flush with said body, and wherein said first, second and third control members are constituted by respective keys grouped on said control unit, wherein said arm rest body is further provided with a manually operable consent push button for inhibiting or enabling activation of said control unit, and wherein said arm rest further comprises a substantially vertical support to be secured to a tractor driver's seat, wherein said arm rest body is swingably connected to said support around a substantially horizontal axis oriented transversely of said body, and wherein first adjustment means are provided for adjusting the inclination of said body relative to said support.

2. Control assembly according to claim 1, further comprising a manually operable control member for controlling a fine adjustment device for engine rotation speed, said manually operable control member being constituted by a roller rotatably carried by said control unit on one side of the arm rest.

3. Control assembly according to claim 2, further comprising fourth control members for an electronically controlled power lift for a three-point hitch, said fourth control members being also constituted by respective keys arranged on said control unit carried by said arm rest.

4. Control assembly according to claim 1, wherein said first adjustment means comprise a manually operable threaded stop member.

5. Control assembly according to claim 1, wherein said arm rest body is further connected to said support in a longitudinally displaceable way, and wherein second adjustment means are provided for adjusting the longitudinal position of said body relative to said support.

6. Control assembly according to claim 5, wherein said body and said support are respectively provided with a movable sliding guide and with a stationary sliding guide slidably coupled to each other, and wherein said second adjustment means comprise a swingable lever connected to said movable sliding guide and manually operable, against the action of resilient return means, so as to lock said movable guide relative to said stationary guide.

7. Control assembly according to claim 5, wherein said arm rest body is rotatably connected to said support around a substantially vertical axis and wherein third adjustment means are provided for adjusting the angular position of said body relative to said substantially vertical axis.

8. An agricultural tractor having a driver's seat arm rest including an arm rest body, an electronically controlled power-shift transmission with a reversing gear and associated first control members for the gear ratio shifting and second control members for selecting forward speed and reverse speed, and an electronic control device of the engine rotation speed with associated third control members, wherein said control assembly is an electrical control unit arranged on said armrest and fitted within a front depression of the arm rest body, substantially flush with said body, and wherein said first, second and third control members are constituted by respective keys grouped on said control unit; said arm rest further comprising a substantially vertical support and said arm rest body being connected to said support in a swingable way around a substantially horizontal axis oriented transversely of said body, in a longitudinally displaceable way and in a rotatable way around a substantially vertical axis; first, second and third adjustment means being provided for adjusting the inclination of said body relative to said support around said substantially horizontal axis, for adjusting the longitudinal position of said body relative to said support, and for adjusting the angular position of said body relative to said support around said substantially vertical axis, respectively, and wherein said arm rest body is further provided with a manually operable consent push button for inhibiting or enabling activation of said control unit.

\* \* \* \* \*